United States Patent Office 3,333,665
Patented Aug. 1, 1967

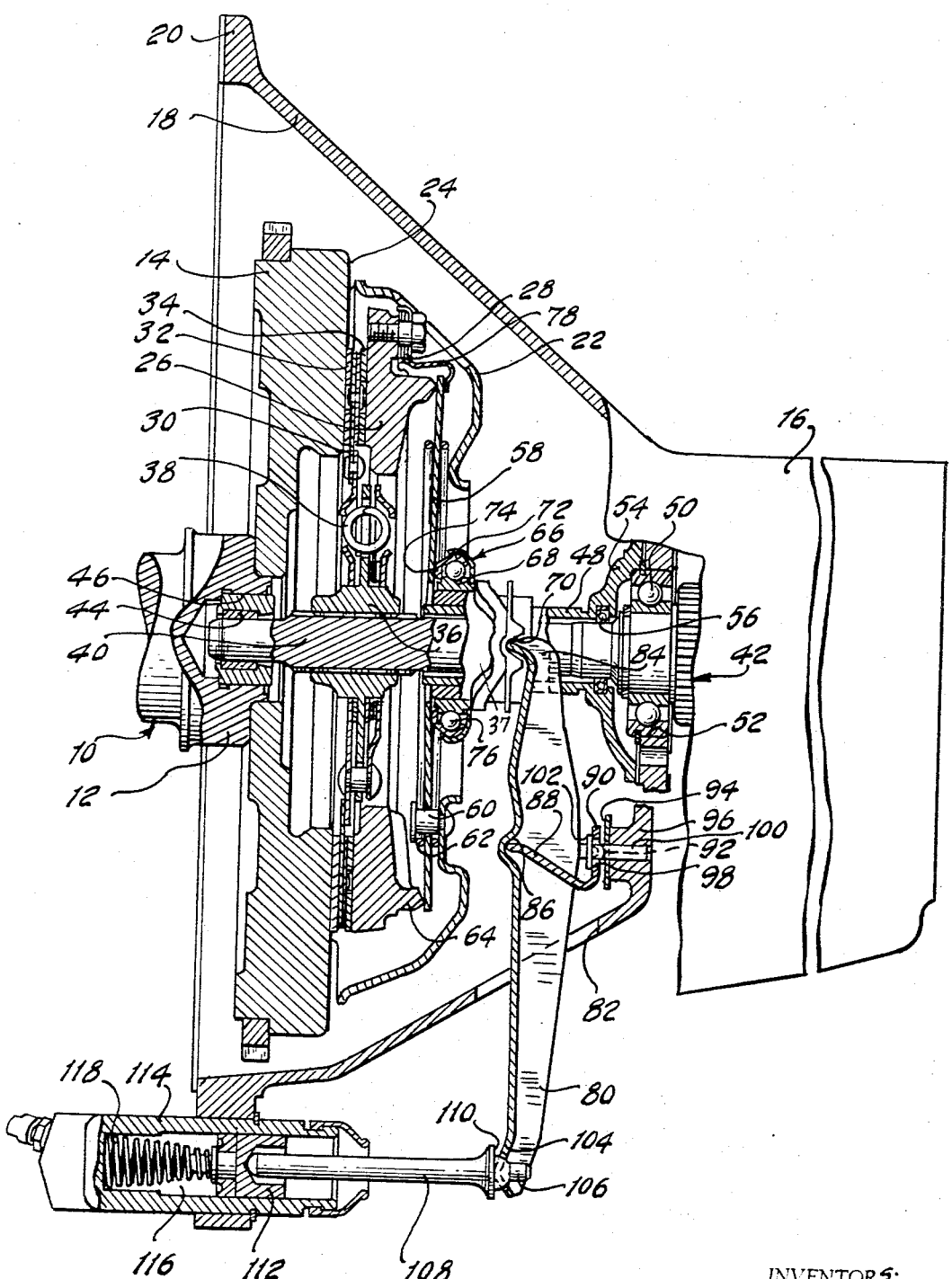

3,333,665
OPERATING LINKAGE FOR A SELECTIVELY ENGAGEABLE FRICTION CLUTCH
Kenneth C. G. Einchcomb, Hornchurch, and Paul E. Waters, Orpington, England, assignors to Ford Motor Company, Dearborn, Mich., a corporation of Delaware
Filed May 12, 1965, Ser. No. 455,280
Claims priority, application Great Britain, June 19, 1964, 25,415/64
2 Claims. (Cl. 192—99)

Our invention relates to improvements in friction clutch operation. More particularly, the improvements of our invention are adapted for use with a neutral clutch in an automotive vehicle driveline for connecting and disconnecting the engine crankshaft and the power input shaft of a multiple speed ratio power transmission mechanism.

The neutral clutch in an arrangement of this type is under the control of the vehicle operator and it is disengaged to interrupt the torque delivery path during driver controlled speed ratio changes in the transmission mechanism. The friction clutch comprises normally a flywheel and a clutch pressure plate that rotate in unison as part of an assembly. Clutch operating levers are carried by the flywheel and pressure plate assembly for relieving the clutch engaging pressure on the pressure plate to effect disengagement. A friction disc is situated between the flywheel and the pressure plate, and it in turn is connected drivably to the power input shaft for the transmission mechanism. The clutch apply force of the pressure plate is obtained by springs carried by rotary portions of the clutch assembly.

It is usual practice to provide a clutch throw-out bearing that may be shifted axially into engagement with the operating ends of the clutch operating levers. The clutch throw-out bearing is mounted upon a bearing sleeve shaft that surrounds the power input shaft for the transmission mechanism.

In the improved construction of our invention we have provided a clutch assembly of the type described in the foregoing paragraphs and have included in it a driver controlled clutch operating lever that is mounted upon a stationary housing portion of the transmission mechanism with freedom to move with a universal or floating motion. A driver operated clutch linkage is connected to one end of the clutch operating lever, and the other end thereof defines a fork that engages the clutch throw-out bearing structure. Upon movement of the operating lever the clutch throw-out bearing shifts axially upon its supporting sleeve shaft. This translatory motion of the throw-out bearing is a result of the arcuate movement of the cooperating end of the operating lever about the point at which it is pivotally mounted upon the transmission housing.

The provision of a clutch mechanism of the general type above set forth being a principal object of our invention, it is a further object of our invention to provide a manually controlled friction clutch with an operating lever and a clutch throw-out bearing wherein provision is made for allowing at all times the point of contact between the operating lever and the clutch throw-out bearing to move in an axial direction thereby eliminating any side loading upon the thrust bearing as it is moved to a clutch disengaging position.

It is a further object of our invention to provide a clutch operating mechanism of the type above set forth wherein the operating lever in the vicinity of the clutch throw-out bearing is in the form of a fork with its ends situated on opposed sides of the axis of the clutch so that it may engage the clutch throw-out bearing at two locations. We contemplate that a universal or floating pivotal connection between the operating lever and the transmission housing will permit the loading of the ends of the operating fork to become balanced thereby avoiding an undesirable torque upon the throw-out bearing that would interfere with its free axial movement.

It is a further object of our invention to provide a driver controlled, selectively engageable neutral clutch for an automotive vehicle driveline wherein provision is made for reducing or eliminating any substantial friction forces that would interfere with clutch engagement or disengagement.

It is a further object of our invention to provide a clutch operating lever and clutch throw-out bearing of the type set forth in the preceding description wherein the points of engagement of the clutch operating lever with respect to the clutch throw-out bearing are situated on a line that intersects with a right angle the axis of rotation of the clutch itself.

Further objects and features of our invention will become apparent from the following description and from the accompanying drawing, which shows in cross sectional form a clutch assembly embodying the improvements of our invention.

Numeral 10 in the drawing designates the crankshaft of an internal combustion vehicle engine, not shown. It is flanged at 12 to permit a bolted connection with an engine driven flywheel 14.

The transmission housing for the vehicle driveline is shown at 16. It includes a clutch bell housing portion 18, which receives the selectively engageable friction clutch of our invention. The peripheral flange 20 of the housing portion 18 may be bolted to the engine block of the vehicle engine in the usual fashion.

A clutch cover 22 is bolted to the right-hand face 24 of the flywheel 14. Disposed within the cover 22 is an annular pressure plate 26. Plate 26 is secured to the cover 22 by chordally extending, axially yieldable straps 28.

A clutch disc 30 having friction surfaces 32 and 34 formed thereon is situated between the pressure plate 26 and the face 24 of the flywheel 14. It is connected to an internally splined hub 36 by means of a damper spring assembly 38. Hub 36 is splined to a power input shaft 40 for the multiple speed ratio power transmission mechanism located within the housing 16. A portion of this mechanism is indicated generally by reference character 42.

The left-hand end of shaft 40 is journaled by means of bushing 44 within a pilot recess 46 formed in the end of crankshaft 10. Shaft 40 extends axially through a stationary bearing sleeve shaft 48 and is journaled by means of a bearing 50 within a bearing opening 52 formed in a bearing support wall of the housing 16.

Sleeve shaft 48 is flanged at 54 to permit a bolted connection with the housing 16. A suitable running seal is provided as shown at 56.

A diaphragm spring 58 is connected by means of pivot studs 60 to the cover 22. Studs 60 can be received through cooperating apertures formed in the diaphragm spring 58 at locations intermediate the inner and outer margins thereof. Pivot rings 62 are situated on either side of the diaphragm spring 58 to permit pivotal motion of the diaphragm spring with respect to the cover 22. This pivotal motion is accompanied by axial displacement of the inner margin of the diaphragm spring 58 with respect to its outer margin.

The outer margin of the diaphragm spring 58 engages an annular boss 64. The inner margin of the diaphragm spring 58 engages a clutch throw-out bearing 66 having an inner race 68 which is secured by means of a force fit upon clutch release element 37. This element 37 is slidably positioned upon sleeve shaft 48 and is formed with diametrically disposed recesses 70. The recesses 70 are situated approximately 180° apart on opposite sides of the axis of the clutch.

The clutch throw-out bearing 66 includes also an outer race 72 having a nose portion 74 that engages the inner margin of the diaphragm spring 58. Each race of the bearing 66 can be grooved to accommodate a plurality of bearing balls 76. Thrust forces acting upon the inner race 68 thus can be transmitted through the balls to the nose portion 74.

The spring 58 is preloaded so that it tends to exert an axial pressure upon the pressure plate 26 thereby normally causing the clutch to assume an engaged condition. If the clutch throw-out bearing is shifted in a left-hand direction as viewed in the drawing, however, the inner margin of the spring 58 is displaced thereby causing the diaphragm spring to pivot about the studs 60 and to release the pressure plate 26. The diaphragm spring 58 is held in place on the cover 22 by means of clips 78.

To provide for shifting movement of the clutch throw-out bearing, the assembly includes an operating lever 80 having a depending portion that extends through an opening 82 formed in the bell housing portion 18. The inward end of the lever 80 defines a fork, the ends of which are indicated in the drawing by reference character 84. One fork end is received within one of the recesses 70. The companion recess 70 on the opposite side of the axis of shaft 40 receives the other end of the fork of the lever 80.

A recess 86 formed in the lever 80 intermediate its ends receives one end of a pivot strut 88 which has one end 90 turned so that it is disposed in a plane that is transverse to the axis of the shaft 40. The end 90 includes a rounded portion 92, which is adapted to engage the face 94 of a boss 96 formed on the housing portion 18. Face 94 is disposed in a plane that is transverse to the axis of the shaft 40.

The end 90 is formed with an opening 98 through which is received a locating pin 100. This pin is situated in an opening formed in the boss 96 and held securely therein. It includes a retaining washer or flange 102. The size of the opening 98 is larger than the diameter of the pin 100. Thus, the strut 88 can move with a universal motion about the axis of the pin 100 as it engages the surface 94.

If desired the rounded portion 92 can be spherical in form or it can be in the form of a transverse rib that extends in a direction transverse to the axis of the shaft 40. The opening 98 in the latter arrangement would extend through the rib.

The lower extremity of the depending portion of the lever 80 is formed with a spherical crown 104 which is apertured to receive a crowned end 106 of a piston rod 108. The rod is formed with a shoulder 110 which engages the crown 104. The piston rod 108 is engaged by a fluid pressure operated piston 112 slidably situated within a servo cylinder 114. The cylinder 114 and the piston 112 define in part a servo having a fluid pressure chamber 116 within which is situated a biasing spring 118. Fluid under pressure is transferred from a master cylinder under the control of the vehicle operator to the chamber 116 to effect shifting movement of the piston 112 in a right-hand direction. This then causes the lever 80 to pivot about the strut 88 thereby shifting the clutch release lever 66 in a left-hand direction to release the friction clutch. As the pressure in the chamber 116 is reduced, the diaphragm spring 58 returns the pressure plate 26 to a clutch engaging position.

The point of contact of the fork ends 84 on the clutch throw-out bearing moves in an axial direction by reason of the ability of the strut 88 to pivot about an axis that is transverse to the axis of the shaft 40. Thus since the contact points lie in a plane that contains the axis of shaft 40, there is substantially no tendency for the clutch release bearing to tilt. As a result, friction between the bearing 66 and the sleeve shaft 48 is reduced to a minimum. If due to errors and manufacturing tolerances the fork ends 84 do not exert equal forces on each of the points of contact with the bearing 66, a turning moment will be produced on the bearing 66 that will increase friction. But if the improvements of our invention are employed, the lever 80 may be caused to pivot about an axis that intersects the axis of shaft 40 and the turning moment can be eliminated. This pivotal movement of the lever 80 about either of the two principal planes of pivotal motion can be accommodated readily by the crown 104 so that continuous engagement between the depending portion of the lever 80 and the shoulder 110 is achieved. No additional friction is introduced at this point.

Having thus described a preferred form of our invention what we claim and desire to secure by U.S. Letters Patent is:

1. In a friction clutch assembly adapted to deliver driving torque from a driving member to a driven member, a first clutch element having a first friction surface connected to said driving member, a pressure plate carried by said first friction element and having formed thereon a second friction surface, a friction disc situated between said friction surfaces, means for connecting said friction disc to said drven member, a clutch operating member extending in a radial direction with its outermost portion engageable with said pressure plate and its innermost portion situated at a location proximate to the axis of rotation of said clutch assembly, means for pivotally connecting said operating member to said first clutch member at a location intermediate the inner and outer ends thereof, a relatively stationary sleeve shaft surrounding said driven member, a clutch throw-out bearing mounted upon said sleeve shaft for sliding movement in an axial direction, said throw-out bearing having portions engageable with the radially inward portion of said radially extending member, a clutch operating lever extending in a direction transverse to the axis of said driven member, one end of said operating lever being engageable with said throw-out bearing, means for moving the other end of said operating lever between the clutch disengaging position and the clutch engaging position, a pivot strut engageable at one end thereof with said operating lever at a location intermediate its ends, said strut being adapted to accommodate shifting movement of said operating lever toward and away from said axis of rotation, means for pivotally mounting said strut at its other end for universal movement with respect to a stationary portion of said assembly, said last recited means including a pivot member on said stationary portion projecting toward said operating lever and through said other end of said strut, said operating member being in the form of a diaphragm spring having an inner margin engageable with said clutch throw-out bearing and a radially outer margin engageable with said pressure plate, said diaphragm spring being preloaded to exert an axial clutch engaging pressure upon said pressure plate, the force reaction of said clutch engaging pressure being distributed to said first clutch element through the pivotal connection for said diaphragm spring, said clutch operating lever comprising a first portion extending radially with respect to the axis of said driven member and a second portion defining a fork, said fork having two ends situated in engagement with said clutch throw-out bearing on opposite sides of the axis of said driven member, the points of contact of said ends being situated substantially in a plane that contains said last-named axis.

2. In a friction clutch assembly adapted to deliver driving torque from a driving member to a driven member, a first clutch element having a first friction surface connected to said driving member, a pressure plate carried by said first friction element and having formed thereon a second friction surface, a friction disc situated between said friction surfaces, means for connecting said friction disc to said driven member, a clutch operating member extending in a radial direction with its outermost portion engageable with said pressure plate and its innermost portion situated at a location proximate to the axis of rotation of said clutch assembly, means for pivotally connecting said operating member to said first clutch member at a location intermediate the inner and outer ends thereof, a relatively stationary sleeve shaft surrounding said driven member, a clutch throw-out bearing mounted upon said sleeve shaft for sliding movement in an axial direction, said throw-out bearing having portions engageable with the radially inward portion of said radially extending member, a clutch operating lever extending in a direction transverse to the axis of said driven member, one end of said operating lever being engageable with said throw-out bearing, means for moving the other end of said operating lever between the clutch disengaging position and the clutch engaging position, a pivot strut engageable at one end thereof with said operating lever at a location intermediate its ends, said strut being adapted to accommodate shifting movement of said operating lever toward and away from said axis of rotation, means for pivotally mounting said strut at its other end for universal movement with respect to a stationary portion of said assembly, said operating member being in the form of a diaphragm spring having an inner margin engageable with said clutch throw-out bearing and a radially outer margin engageable with said pressure plate, said diaphragm spring being preloaded to exert an axial clutch engaging pressure upon said pressure plate, the force reaction of said clutch engaging pressure being distributed to said first clutch element through the pivotal connection for said diaphragm spring, said clutch operating lever comprising a first portion extending radially with respect to the axis of said driven member and a second portion defining a fork, said fork having two ends situated in engagement with said clutch throw-out bearing on opposite sides of the axis of said driven member, the points of contact of said ends being situated substantially in a plane that contains said last-named axis, said clutch throw-out bearing comprising a first race mounted for axial movement upon said stationary sleeve and another race engageable with the inner margin of said diaphragm spring, bearing elements situated between said races for transmitting thrust therebetween, a cylindrical member slidably mounted upon said sleeve, and carrying said first race, said cylindrical member having a pair of notches situated on diametrically opposed sides of said sleeve, the ends of said fork being situated in said notches.

References Cited

UNITED STATES PATENTS

| | | | |
|---|---|---|---|
| 2,250,394 | 7/1941 | Reed | 192—99 |
| 2,321,513 | 6/1943 | Reed | 192—99 |
| 3,220,524 | 11/1965 | Puidokas | 192—99 |
| 3,235,049 | 2/1966 | Hufstader | 192—89 |

FOREIGN PATENTS

| | | |
|---|---|---|
| 647,031 | 6/1937 | Germany. |

BENJAMIN W. WYCHE III, *Primary Examiner.*